United States Patent Office.

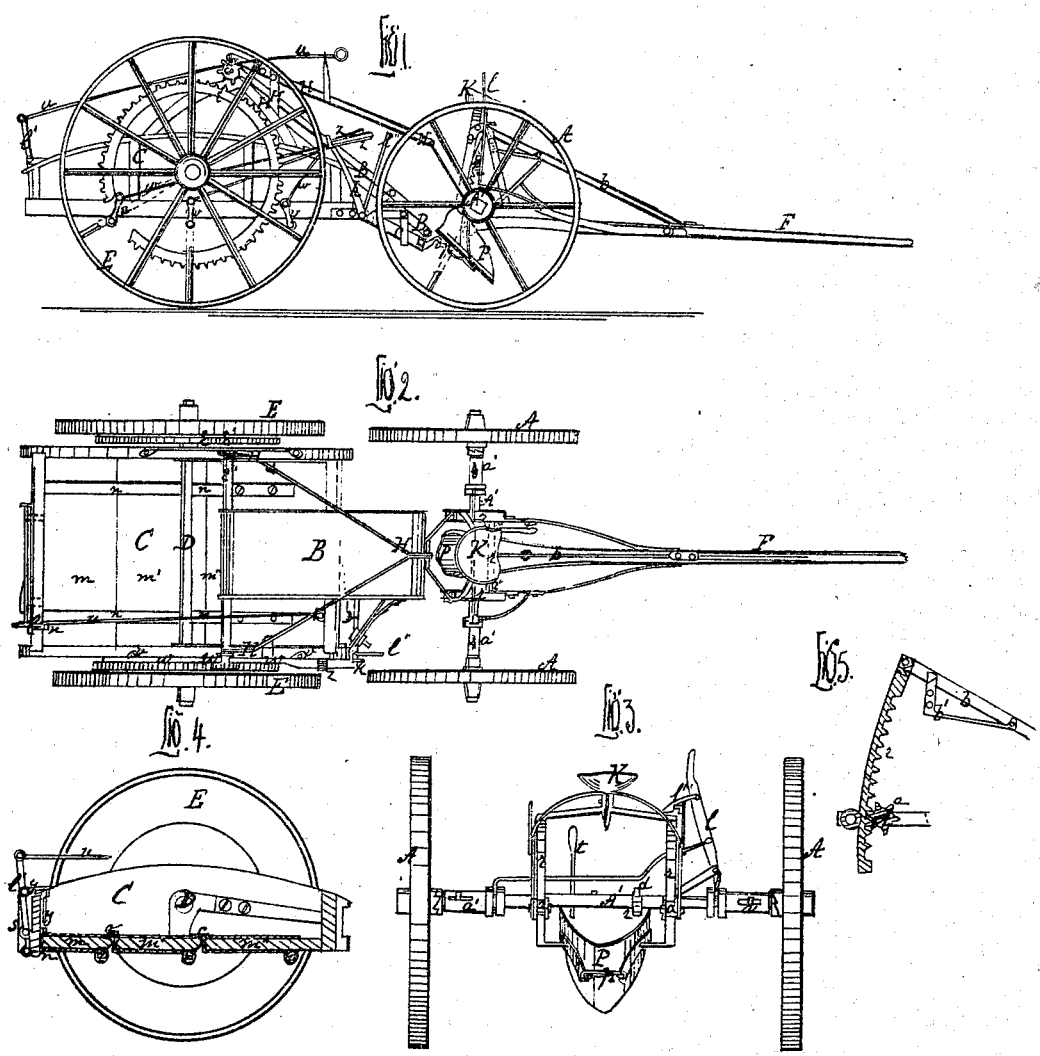

BENJAMIN SLUSSER, OF SIDNEY, OHIO, ASSIGNOR TO HIMSELF AND ELIAS M. GLUCK, OF SAME PLACE.

Letters Patent No. 72,098, dated December 10, 1867.

IMPROVED EXCAVATOR.

The Schedule referred to in these Letters Patent and making part of the same.

TO ALL WHOM IT MAY CONCERN:

Be it known that I, BENJAMIN SLUSSER, of Sidney, in the county of Shelby, and State of Ohio, have invented a new and improved Self-Loading Excavator; and I do hereby declare the following to be a full, clear, and exact description of the same, reference being had to the accompanying drawings, forming part of this specification, and in which—

Figure 1 is a side elevation of my invention.

Figure 2 is a top view of the same.

Figure 3 is a rear elevation of a part of my invention, showing the forward wheels and axle, and the means for elevating the plough.

Figure 4 is a longitudinal vertical section through the centre of the cart-body connected with my excavator; and Figure 5 is a view of the pinion and rack shown at $a\ r$ in figs. 1 and 3.

In this invention a pinion attached to the forward axle is made to elevate the plough when desired, and at the same instant ungear and stop the endless apron-carrier that conveys the dirt from the plough to the cart. A new method of instantly unloading the cart and setting it again to receive another load is shown.

Similar letters of reference indicate corresponding parts in the several figures.

In the drawings, A represents the forward wheels, and A′ their axle; B, the endless-apron carrier or belt, which conveys the dirt excavated by the plough to the cart; P, the plough, acting under the axle A′; and C, the cart, supported and pivoted across its centre upon the axle D of the rear wheels E E. The machine being drawn along by the draw-beam F, the dirt is excavated by the plough and thrown back upon the carrier B, which, operated by the rear wheels by means of the cog-gear $e\ e'$ and roller $e''$, conveys it backward and upward and delivers it into the cart C until the latter is loaded. The roller $e''$ bears in a frame, H, attached to and supported by the forward end of the cart C, so as to be raised whenever the forward end of the cart is raised; and thus be thrown out of gear, stopping the revolutions of the endless-apron carrier. A stiff coupling, $c$, connects the forward end of the cart with a strong lug, $p$, on the rear side of the plough. The forward or lower end of the carrier is attached to, and supported upon, the forward end of the coupling, so as to be raised when the coupling is raised. The plough P is attached to and supported by two vertical slightly-curved racks, $r\ r$, connected together at their top, operated by pinions $a\ a$, fixed to the fore axle, and held in position by a brace, $b$, which permits the rack to work up and down, but not to depart from a nearly vertical position. $b'$ is a gauge affixed to the brace $b$, to regulate the height to which the plough can thus be elevated. The fore wheels A A work independently of their axle, but, by means of a sleeve-clutch, $a'$, operated by a lever, $l$, can be connected with it, so that the motion of the wheels will rotate the axle. The lever $l$ is provided with a dog or pawl, $l'$, which will, when in position, hold the clutch in contact with the wheel. As long as the lever is in the position shown clearly in fig. 3, the clutches operate upon the wheels, causing the axle to rotate with the wheels, and elevating the racks $r\ r$, and with them the plough P and the forward end of the cart C, and thus raising roller $e''$ and its pinions $e'\ e'$, so as to throw the latter out of gear and arrest the motion of the carrier. If, now, the lever be reversed, the clutches will be disconnected from the wheels, and the latter will rotate, while the axle remains immovable. To prevent the weight of the plough and rack from rotating the axle backwards, a ratchet, $r'$, and pawl, $d$, the latter fixed to a rocker-shaft, $r'''$, and operated by a treadle, $t$, under the driver's seat, K, are provided, by which the axle can be held immovable till the driver desires to put the plough into the ground again, when a slight pressure of his foot upon the treadle $t$ will liberate the axle, and the plough will fall back by its own weight, lowering the forward end of the cart with it, and again bringing the working-roller of the carrier into gear, and setting the latter in operation. Thus, whenever the plough is raised so as not to take in the ground, the carrier is ungeared and caused to stop automatically; and when the plough is again put into the ground, the carrier is again, by the same act, brought into gear and set in operation. The whole work of raising the plough and ungearing the carrier, it will be observed, is performed by the power of the forward axle, operated by the draught-wheels A A. The driver has nothing to do but to move the lever $l$ to and fro, at the proper time, connecting or disconnecting the clutches, and to press the treadle with his foot when he desires to set the plough and carrier at work.

Having thus described that portion of my machine which operates to excavate the earth and convey it to the cart, I will now describe my improved arrangement for dumping the dirt and again preparing the cart to receive another load.

To accomplish this, I make the bottom of the cart of several pieces or trap-doors, $m$, $m'$, $m''$, bearing on journals $i\ i$, at their forward corners, and the rear edge of each one supported by the forward edge of the one next behind it by means of a lip or projection, $o\ o$. The last of the series $m$ has its rear edge supported by a trigger, $n$, held in place by a spring, and operated by a lever, $l'$, from which a rod, $u$, runs forward to within reach of the driver's seat, so that the trigger can be withdrawn and all the trap-doors $m\ m'\ m''$ sprung at once by a slight pull of the rod by the driver. The doors are so hung and arranged that when the trigger is pulled away from the rear one it falls, withdrawing the support from the rear edge of the next one, which, in its turn, falls automatically, withdrawing the support from the rear edge of the forward one, which then also falls. Thus the driver liberates the rear door and causes it to drop, and the dropping of the rear door liberates all the rest and causes them to fall successively. The doors having thus been sprung and the cart emptied, they can be set again by an arrangement at the side of the cart, shown in fig. 1, consisting of the levers $v\ v\ v$, operated by connecting-rods $w\ w\ w$, each terminating at its forward end in a loop, $z\ z$, through which passes an arm, $k$, operated by a lever, $l''$. The loops enable the doors to drop without resistance from the lifting-apparatus just described. When thus dropped, the driver pulls the lever $l''$ slightly towards him, and raises all the trap-doors to their former position at once. The rods $w\ w\ w$ are made of such a length that the forward trap-door $m''$ will be first raised, then the next, and last of all the rear one, $m$, in order that the catches or lips $o\ o$ may operate properly without failure. $y$ is a hook, fixed to the lever $l'$, which, when the latter is thrown forward by the rod $u$, catches over the rear end of the cart and keeps the trigger $n$ out of the way till the trap-doors are set again. As the last door comes into position it strikes a short rod, $y'$, and knocks it up against the hook $y$, releasing it, and allowing the spring $s$ to force the trigger under the trap-door and hold it up.

It is evident that this apparatus works with the greatest economy, not only in the time saved by it, but in the strength and labor required to operate it, all the parts, except the trap-doors, being operated by the force applied at the draught-wheels, and the trap-doors themselves opening and discharging the load by the force of gravity, only requiring the exercise of a slight force upon the lever in order to raise them again. The machine is not complicated, and the various parts of the apparatus are less liable to get out of order than are most machines for a similar purpose, which do not accomplish half the work accomplished by this. Instead of two sleeve-clutches and two racks $r$ and pinions $a$, one alone may be used, and will probably be sufficient in ordinary machines.

Having thus described my invention, what I claim as new, and desire to secure by Letters Patent, is—

1. The method of elevating or adjusting the plough of an excavator by the rotary motion of the forward axle, derived from the forward wheels by means of the clutches $a'\ a'$, substantially as and for the purposes set forth.

2. In combination with the above, I claim the plough P, racks $r\ r$, and pinion $a$, when the latter is fixed to the axle, and operates to raise the plough by power derived from the axle, substantially as and for the purpose specified.

3. The combination of the rocking-cart C, gear $e\ e'\ e''$, apron B, and plough P, when the parts are so constructed and arranged that by the raising or depressing of the plough, the wheels $e\ e'$ shall be thrown into or out of gear, and the apron put in motion or stopped, substantially as and for the purpose specified.

4. The combination of the looped rods $w\ w\ w$ with the arms $v\ v\ v$, doors $m\ m'\ m''$, and lever $l''$, substantially as and for the purpose specified.

5. The lips or projections $o\ o$ of the doors $m\ m'\ m''$, substantially as and for the purposes set forth.

6. The combination of the rod $u$, lever $l'$, spring $s$, trigger $n$, doors $m\ m'\ m''$, having the lips $o\ o\ o$, rod $y'$, and hook $y$, substantially as and for the purposes specified.

BENJAMIN SLUSSER.

Witnesses:
    JAMES McCULLOUGH,
    J. F. FRAZER.